NON-DESTRUCTIVE READ-OUT OF MAGNETIC CORES

Filed May 25, 1956

INVENTORS
TUNG C. CHEN
JOHN H. LANE
BY George Baron
ATTORNEY

United States Patent Office 2,918,660
Patented Dec. 22, 1959

2,918,660

NON-DESTRUCTIVE READ-OUT OF MAGNETIC CORES

Tung C. Chen, Havertown, and John H. Lane, Malvern, Pa., assignors to Burroughs Corporation, Detroit, Mich., a corporation of Michigan Application May 25, 1956, Serial No. 587,239

13 Claims. (Cl. 340—174)

This invention relates to information storage systems and more particularly to information storage systems utilizing magnetic cores.

In the computing art, in the communication art involving electromagnetic signalling, and in similar or related arts, information is retained in a suitable storage device, such retention being either very ephemeral, say, of the order of microseconds, or for longer indefinite periods of time. Of the many techniques for storing information in the form of electromagnetic signals, magnetic storage devices and systems utilizing such magnetic storage devices offer certain advantages over other types of storage systems, e.g., permanence of stored information over a comparatively long period without maintenance of a power supply, retention of magnetic characteristics despite long use, resistance to physical and thermal shock, etc. The storage device that retains information in the form of a stable magnetic remanence condition is a magnetic substance preferably, though not necessarily, having a rectangular hysteresis loop and may be cup-shaped or toroidal-shaped, or in the shape of strips, ribbons, or bars.

Magnetic substances that possess that characteristic of retaining information either in positive or negative magnetic remanent states can be used to store signals that are expressable in binary form. A winding coupled to such a core, when carrying current of a given polarity therethrough, can be made to drive such a core to its positive saturation level, the core settling back to its positive remanent state when the driving current terminates. The same winding, when carrying current therethrough of an opposite polarity, can be made to drive such a core to its negative saturation state, the core relaxing to its negative remanent state upon the termination of the driving current pulse. The two stable states can signify the storage of a binary "1" or a binary "0," wherein the positive remanent state may be arbitrarily chosen to represent the storage of a "1" and the negative remanent state the storage of a "0".

In the normal operations performed with information represented in binary form, it is desirable to be able to determine whether a magnetic storage element is retaining a "1" or a "0". In the process of determining the magnetic remanence of a storage element, namely, whether it is in its "1" or "0" state, an interrogating or sensing winding is wound about the storage element. A current pulse of the proper polarity is sent through the interrogating winding in order to test the state of the storage element. If the interrogating current finds the storage element in a magnetic remanent state so as to drive the storage element toward the nearer saturation level of its B—H curve, relatively little flux change will take place in the flux path of such storage element. However, if the interrogating current finds the storage element in such a state so as to drive the storage element from one magnetic remanent state to its opposite magnetic remanent state, a relatively high flux change will take place in the flux path of such storage element. An output winding is normally associated with the storage element in order to sense such changes in flux. The output winding is coupled to an indicating device which indicates these flux changes and a large change of flux in the output winding would arbitrarily be chosen to indicate the presence of a "1" in the storage element prior to interrogation of the storage element. A small flux change in the output winding would be indicative of the presence of a "0" in the magnetic storage element just prior to its interrogation.

In the aforementioned method of testing or interrogation of the state of a binary magnetic storage element, information stored in the core is destroyed as a consequence of the interrogation. Where it was desired to interrogate the storage element without destroying the information therein, auxiliary circuits and additional pulse times were employed in order to read back into the storage element the very information just destroyed in the process of interrogation. The instant invention is able to accomplish the non-destructive read-out of information stored in a binary magnetic storage element without the reliance on auxiliary circuits and additional pulse times. Such non-destructive read-out is attained by utilizing a bistable magnetic element having what will be referred to herein as a toroidal core although it is understood that other geometrical configurations could be substituted for the preferred embodiment.

In a copending application, Serial No. 819,451, filed by T. C. Chen on June 10, 1959 for an invention entitled "Magnetic Device" and assigned to the same assignee as the instant application, there is shown and claimed a technique for attaining non-destructive read-out of the binary state of a toroidal core. This application is a continuation of an earlier filed co-pending Chen application Serial No. 383,801, filed October 2, 1953, which now stands forfeited. In such copending applications, a toroidal core is driven toward one of its two stable states or magnetic remanence by applying a suitable magnetomotive force to the core. When the magnetomotive force is withdrawn or terminated, the core relaxes to a stable state of magnetic remanence, which shall be assumed to be its positive remanent state. The toroidal core has a central aperture and also a smaller aperture located in the circumfenential face of the core. A winding is wound about a leg of the core through the smaller aperture, such winding being connected to a source of electrical signals that are adapted to send interrogating current through the winding. The interrogating current sent through such winding tends to create a flux about at least the smaller aperture, such flux serving to modify the major flux existing in the core because of its magnetic remanent state. An output winding is coupled to the core for the purpose of sensing such modification of the major flux by the flux created by the interrogating current. The state of the core is determined by a signal pulse induced in the output winding during such modification, the core relaxing to its positive remanent state when the interrogating current signal terminates.

The present invention is an improvement over the invention disclosed and claimed in the copending Chen application Serial No. 383,801. In the aforementioned Chen application, the large hole is centrally and symmetrically located, whereas in the instant case the large hole is asymmetrically disposed or offset from the geometric center of the core which for convenience will be referred to as a toroid even though it may not technically be a toroid. It was ascertained by the present applicants that it was desirable, under certain specific conditions, for a given size core, to attain a relatively large local flux area with respect to the major flux path of the core in order to obtain a relatively large signal in the output winding during interrogation of the core. Moreover, in the design of a magnetic memory system, it is desirable to retain the advantage of non-destructive read-out using the apertured core of the aforementioned Chen application, yet achieve the advantage of offsetting the large hole of the core from the geometrical center of the core.

It is an object of this invention to attain an improved non-destructive read-out system utilizing magnetic cores.

It is another object to increase the signal strength obtained during the non-destructive interrogation of an apertured magnetic core.

It is a further object to provide a simple and novel means for accomplishing non-destructive read-out of a magnetic core.

These and other objects and features of the invention will be more fully understood from the following detailed description when read in conjunction with the drawings, in which.

Figures 1, 2, 3, 4:
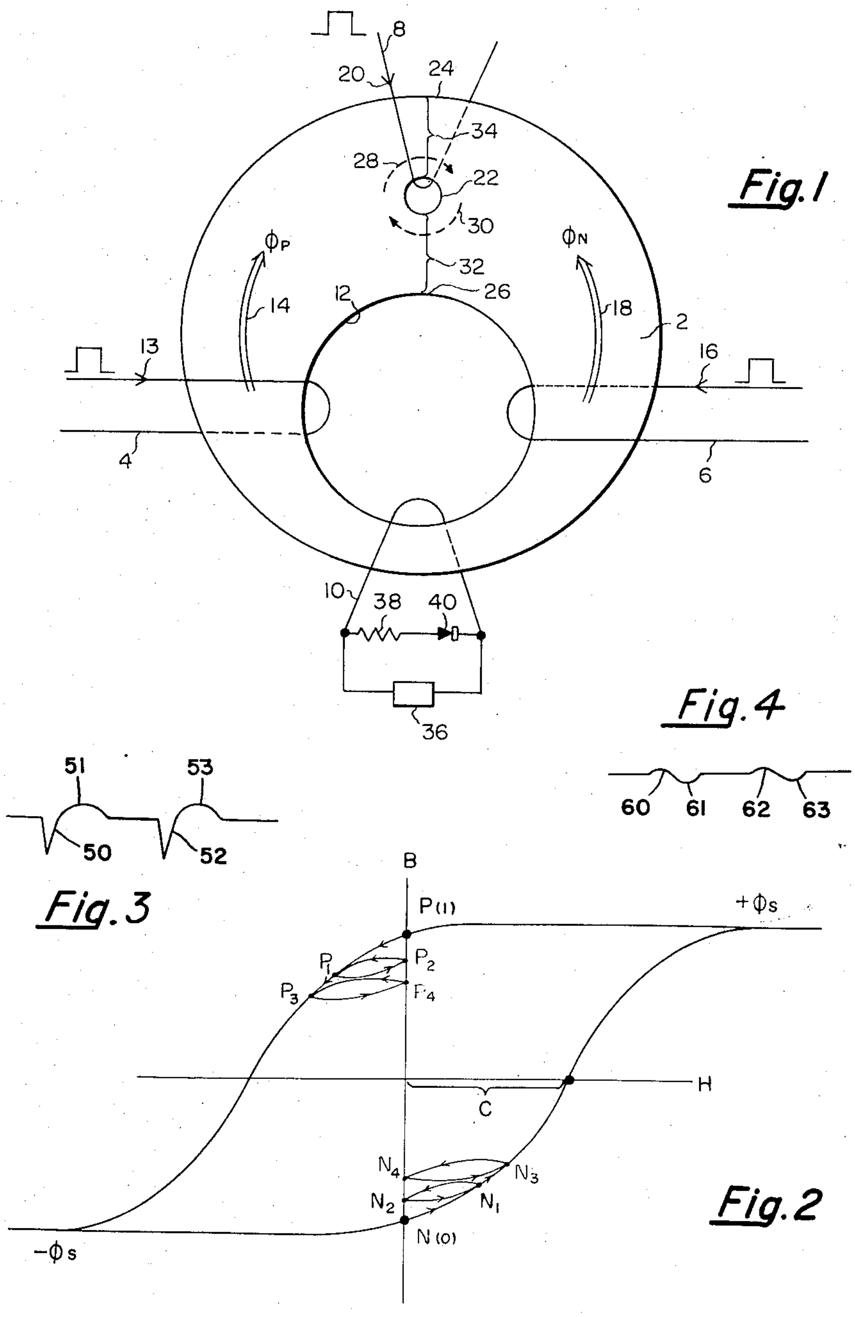
Fig. 1 is a diagrammatic view of an apertured core and associated circuitry.
Fig. 2 is a representative hysteresis loop of the binary magnetic core which may be employed in this invention.
Figs. 3 and 4 are graphical representations of the voltages developed across the output circuit during interrogation.

Fig. 1 shows a generally toroidal shaped core 2 which may have a generally rectangular hysteresis loop of the general configuration shown in Fig. 2. Although it is desirable that the B—H loop for core 2 be substantially that of the generally rectangular configuration shown in Fig. 2, the instant invention will operate satisfactorily even if there is substantial deviation from such configuration. An input or set winding 4, a reset winding 6, interrogating winding 8 and output winding 10 are located about core 2 in the manner shown in Fig. 1. The windings are schematically shown as consisting of a single turn, but it is understood that this is merely a symbolic representation and that each winding will usually, although not necessarily, have more than one turn. The input winding 4, the reset winding 6 and the output winding 10 pass through the larger hole 12 of the core, whereas the interrogating winding 8 passes through a smaller aperture 22, the two holes bearing a particular relation to one another and the outer periphery of the core, as later described herein.

A current pulse entering winding 4 in the direction of the arrow 13 will drive core 2 to $+\phi_S$ along the B—H loop shown in Fig. 2 provided such current pulse creates sufficient magnetomotive force to overcome the coercivity C of the core and drive the latter from point N to $+\phi_S$. When the current pulse through input winding 4 terminates, core 2 relaxes to its positive magnetic remanent state P. Arrow 14 represents the positive remanent state, or "1" state, of core 2 and will also indicate the storage of a binary "1." Another current pulse entering reset winding 6 in the direction of 16 will, if it supplies sufficient magnetomotive force to core 2, cause core 2 to go from point P to $-\phi_S$ along its hysteresis loop, such core 2 relaxing to its negative remanent state N when such current pulse terminates. Arrow 18 represents the negative remanent state, or "0" state, of the core 2. It is understood that the state of core 2 can be reset from its positive remanent state to its negative remanent state by having a current pulse enter set winding 4 in a direction opposite to that shown by arrow 13. Such manner of resetting core 2 would dispense with the need of reset winding 6.

Electrical signal pulses enter interrogating winding 8 in the direction of arrow 20 and supply a magnetomotive force to core 2 which M.M.F. is not sufficient to overcome the coercivity of core 2 but is sufficient to create a flux about at least aperture 22 located midway between the outer and inner peripheries 24 and 26, respectively, and also to a limited degree about hole 12 of core 2. Such magnetic flux created by the interrogating current pulse is depicted by arrows 28 and 30.

The operation of the non-destructive read-out of a "1" from core 2 will now be described. Core 2 is assumed to have been placed in its positive magnetic remanent state by the proper M.M.F. applied to the core through set winding 4, such remanent state being represented by arrow 14. The flux created by the interrogating pulse is sufficient to saturate legs 32 and 34, such saturation in effect being tantamount to an increase in the reluctance of core 2 to the remanent flux field $\phi_P$. Such momentary increase in reluctance in the vicinity of the aperture has the effect of decreasing the magnitude of the residual flux $\phi_P$, which is equivalent to moving slightly downward from point P to $P_1$ of the hysteresis loop. Such decrease in flux is sensed by output winding 10, and a voltage is induced therein of a polarity to drive current through the output circuit 36 from right to left. Output circuit 36 is shunted by a circuit comprising resistor 38 and diode 40, and since the diode 40 is poled to offer high impedance to current flow from right to left, a voltage pulse of substantial magnitude appears across the output circuit 36. Such pulse is represented in Fig. 3 by the negative pulse 50. Upon termination of the interrogating current pulse, the field about the aperture 22 due to the interrogation pulse collapses, allowing the legs 32 and 34 to return to a non-saturated state. Such return to a non-saturated state, however, does not cause a return from point $P_1$ to P. In reality, the core 2 returns from $P_1$ to $P_2$, such return yielding an output voltage across the terminals of output winding 10 which output voltage is opposite to that obtained during the initiation of the interrogating current pulse. This is represented in Fig. 3 by the positive pulse 51 which is of substantially lower amplitude than negative pulse 50 since the shunting diode 40 is poled to offer low impedance to current flow in this direction. Stated another way, the shunting of output circuit 36 with resistor 38 and diode 40 favors one output signal over the other output signal during interrogation so that only one relatively high amplitude signal pulse is developed across output circuit 36 when the core 2 is interrogated when in a positive magnetic remanent state. When the core 2 is interrogated a second time, the flux $\phi_P$ is decreased from point $P_2$ to $P_3$ and upon termination of the interrogation current pulse, the core returns to point $P_4$ instead of point $P_2$. Such second interrogation produces across the output circuit 36 the high-amplitude negative pulse 52 and the low-amplitude positive pulse 53, as shown in Fig. 3. Subsequent interrogations will cause the core 2 to traverse the minor hysteresis loop $P_4$ to $P_3$ to $P_4$ so that repeated interrogations of the core 2 will create an output in winding 10 without destroying the positive remanent state of the core 2, such positive remanent state representing the storage of the binary "1."

When core 2 has been set to its negative remanent state $\phi_N$ or "0" state, the interrogating pulse again creates a flux around at least aperture 22 and also probably around hole 12, but this time the minor hysteresis loops that are traversed are N to $N_1$ to $N_2$ and from $N_2$ to $N_3$ to $N_4$ and all subsequent interrogations of the negative remanent state involve the minor hysteresis loop $N_4$ to $N_3$ to $N_4$. However, because of the orientation of diode 40, the voltage induced in output winding 10 during the leading edge of the interrogation pulse when the core 2 in its negative remanent state is of a polarity to drive current in the forward or low impedance direction of diode 40, causing the shunt circuit comprising resistor 38 and diode 40 to impose a loading on core 2. This loading of the core 2 during the initiation of interrogation of a "0" state results in a smaller output signal being developed across output circuit 36 than is developed across said output circuit 36 when a "1" is being interrogated. This follows from the fact that since, on interrogation of the core 2 when in the negative remanence or "0" state, the voltage induced in the output winding 10 by the leading edge of the interrogation pulse is of such polarity that the diode 40 of the shunt circuit 38, 40 offer very low impedance. The current flow through winding 10 is therefore large, the induced back E.M.F. is large, and the net flux change is small. Upon termination of the interrogation pulse, the core 2 returns towards its negative remanent state and the voltage thereby induced is of such polarity that the shunt circuit including the diode 40 represents a high impedance. However, since the flux change away from negative remanence was small, the flux change during the return to negative remanence is also small. Thus, the voltage developed across the output circuit 36 on interrogation of the core 2 when in the negative remanence or "0" state is small, as is represented in Fig. 4 by the low-amplitude positive pulses 60 and 62, and the low-amplitude negative pulses 61 and 63. It is readily understood that by changing the orientation of the diode, one may obtain better discrimination in the output circuit 36 for read-out of a "0" than for the read-out of a "1."

It is noted that the setting and resetting of core 2 from its "1" state to its "0" state and vice versa will induce much higher signal levels in output winding 10 than are produced in the output winding 10 during interrogation. Consequently suitable inhibit means are utilized to prevent the passage of such higher signal levels to output circuit 36 during the setting and resetting steps. Such inhibit means are well known and may be employed, but since such means do not form any part of the instant invention, they are not shown. One could arrange to have the signal pulse that actuates the set and reset windings 4 and 6, respectively, also disable the output circuit 36.

The flux that is created in leg 34 by the interrogating current must not be so large as to switch core 2 from one remanent state to its other remanent state, but it should be sufficient to modify the major flux existing in the core as hereinabove described. The flux created by the interrogation current may be looked upon as affecting the reluctance of the major flux paths 14 and 18. An increase in area of saturation about aperture 22 is tantamount to an increase in the size of an air gap that could be placed in the path of either major flux path, such hypothetical air gap serving to momentarily modify the flux state of the core being interrogated to yield a signal pulse in the output winding on the core.

The present invention provides, among other features, this increased saturation area (legs 32 and 34) by offsetting the large aperture of the toroidal core storage device, such offsetting resulting in a higher signal level in the output winding of the toroidal core than would be available when the large hole is centrally located in the core. In the illustrated embodiment of the invention the larger hole 12 of the toroidal core body is shifted with respect to the axis thereof such that one side of the core body may have a radial thickness at least twice as great as the opposite side, as shown. The smaller aperture 22 is located in this thickened area of the core body and preferably as shown in the drawing at the maximum radial thickness thereof and with its axis midway between the inner and outer peripheries 26 and 24, respectively, of the core. The dimensions of the two holes 12 and 22 with respect to one another and to that of the core body and the relationship of their displacement is preferably such that an appreciable thickness of material of the core body is provided in the legs 32 and 34 on opposite sides of the smaller aperture, but without reducing the cross section of the opposite part of the core body to the extent it would be weakened. Thus it is apparent that from the functional point of view this improvement has provided increased cross sectional areas on the opposite sides of the smaller aperture 22, as identified by the legs 32 and 34, thus providing an increased saturation area about this aperture which may be used for sensing the state of the core; and it is also apparent from the structural viewpoint, the asymmetrical relation of the larger hole 12 to the axis of the core body provides a greater radial thickness in the body for the location of the smaller aperture 22 therein, thus providing a strong bodily structure for the eccentrically related holes therethrough.

Having therefore described the invention and its operation, those features of novelty believed descriptive of its nature and scope are defined with particularity in the appended claims.

What is claimed is:

1. A magnetic storage device comprising an annularly shaped core of magnetizable material having a substantially square hysteresis loop, said core having a relatively large opening offset from its center, and a relatively small aperture located in the wider portion of said core midway between the outer and inner peripheries thereof.

2. A magnetic storage device as defined in claim 1 including means for creating a magnetic flux completely around the core in either direction of polarity.

3. A magnetic storage device as defined in claim 2 wherein an interrogating winding is inserted in said aperture, said interrogating winding being capable of carrying a current therethrough so as to create a flux field in the region of said aperture.

4. A magnetic storage device comprising an annularly shaped core of magnetizable material capable of assuming stable states of magnetic remanence of either of two polarities, said core having its opening offset from the normal center of said core, an aperture in the body of said core and located between the outer and inner peripheries of said core in the wider portion thereof, means for creating a magnetic flux completely around the core, and winding means through said aperture for creating flux in the region of said aperture, said last-named flux serving to modify said magnetic flux existing around the core.

5. A magnetic storage device such as defined in claim 4 including an output winding on said core, said output winding adapted to have induced therein a potential indicative of such flux modification.

6. A magnetic storage device comprising in combination an annularly shaped core of magnetizable material capable of assuming stable states of magnetic remanence of either of two polarities, the opening of said core being offset from the center of said core, an aperture located between the inner and outer peripheries of said core in the wider portion thereof, means for creating a magnetic flux completely around the core in either direction of polarity, an interrogating winding through said aperture for producing a magnetic field, and a further winding means about the core for producing voltages responsive to changes in the flux extending completely around said core caused by the current through said interrogating winding.

7. A magnetic storage device as defined in claim 6 wherein said aperture is located substantially midway between the inner and outer peripheries of said core in the wider portion thereof.

8. A bistable magnetic storage device comprising, in combination, a circular toroidally shaped core body of magnetizable material having a substantially square shaped hysteresis loop characteristic, said core body having its relatively large central aperture circularly shaped and having its axis displaced with respect to the axis of the core body such that the radial thickness of one side of the core body is at least substantially twice that of the opposite side of the body, a smaller aperture in the radially thicker side of the core body, said smaller aperture being located on the radius of the core body intersecting the maximum thickness of the radially thicker side thereof and having a diameter not greater than one-half the radial thickness of this side of the core body, a winding on the core body passing through the larger aperture thereof and operable when a current is passed therethrough for creating a magnetic flux completely around the core body in a given direction of polarity, an interrogating winding on the core body passing through the smaller aperture and operable when a current is passed therethrough to produce a magnetic field encircling at least the smaller aperture, and a further winding about the core body passing through the larger aperture and operable to produce voltages responsive to changes in the magnetic flux extending completely around the core body caused by the current through said interrogating winding.

9. A magnetic device comprising a body of magnetic material capable of assuming stable states of magnetic remanence of either of two polarities, said body having a relatively large off-center opening and a relatively small aperture located in the radially thick portion of said body; means for placing said body in a state of magnetic remanence of either polarity; a winding through said aperture; means for driving through said winding a current pulse of a magnitude to alter the magnetic flux surrounding at least said aperture; and means for sensing the effect of such current pulse through said aperture winding on the magnetic flux condition of that portion of said body which is remote from said aperture, thereby to ascertain the polarity of the magnetic remanence of said body.

10. A magnetic device comprising a body of magnetizable material capable of assuming stable states of magnetic remanence of either of two polarities, said body having a relatively large off-center opening and a relatively small aperture located in the radially thick portion of said body; means including an input winding through said opening for placing said body in a state of magnetic remanence of either polarity; an interrogation winding through said aperture; means for driving through said interrogation winding a current pulse of a magnitude to alter the flux condition of said body in at least a local area surrounding said aperture; and means including an output winding through said opening for sensing the deviation from the magnetic state of remanence of that portion of said body which is removed from said local area and which results from said interrogation current pulse, thereby to sense the polarity of the magnetic state of remanence of said body.

11. Apparatus as claimed in claim 10 characterized in that said sensing means includes a load impedance across said output winding and an asymmetrically conducting device in shunt across said load impedance for developing an output signal which is of larger magnitude when said core is of one polarity of magnetic remanence than is developed when said core is of the other polarity of magnetic remanence.

12. A magnetic device comprising a body of magnetic material capable of assuming stable states of magnetic remanence of either of two polarities, said body having a relatively large off-center opening and a relatively small aperture centrally located in the radially thick portion of said body; means including an input winding through said opening for applying a magnetomotive force of sufficient magnitude to control the polarity of the magnetic remanence of said body; means including a winding through said small aperture for applying a variable magnetomotive force of a magnitude to vary the flux level in said radially thick portion of said body, thereby to vary the level of magnetic remanence of said body outside said thick portion; and means including an output winding through said opening and about a portion of said body outside said thick portion for developing an output signal whose magnitude is a function of the polarity of the magnetic remanence of said body.

13. Apparatus as claimed in claim 12 characterized in that both the outer periphery of said body of magnetic material and the periphery of said large off-center opening are circular in configuration.

References Cited in the file of this patent

UNITED STATES PATENTS 2,803,812 Rajchman et al. ---------- Aug. 20, 1957

OTHER REFERENCES

"The Transfluxor," by J. A. Rajchman and A. W. Lo. Proceedings of the I.R.E., vol. 44, issue 3, pp. 321–332, March 1956.

"Saturable Transformer As Gates," by Burnjam Moffat. Electronics, pp. 174–178, September 1954

Notice of Adverse Decision in Interference

In Interference No. 91,495 involving Patent No. 2,918,660, T. C. Chen and J. H. Lane, Non-destructive read-out of magnetic cores, final judgment adverse to the patentees was rendered Oct. 2, 1962, as to claims 1, 2, 3, 4, 5, 6 and 7.

[*Official Gazette November 6, 1962.*]